United States Patent [19]

Gute

[11] 4,088,374
[45] May 9, 1978

[54] AIR PRESSURE BRAKE ARRANGEMENT FOR TRACTOR AND SEMI-TRAILER COMBINATIONS

[75] Inventor: Robert M. Gute, Corunna, Mich.

[73] Assignee: Midland-Ross Corporation, Cleveland, Ohio

[21] Appl. No.: 790,309

[22] Filed: Apr. 25, 1977

[51] Int. Cl.² ........................................... B60T 15/48
[52] U.S. Cl. .................................................... 303/9
[58] Field of Search ................ 188/170; 303/7, 9, 29, 303/63, 64, 70, 71

[56] References Cited

U.S. PATENT DOCUMENTS

| | | | |
|---|---|---|---|
| 3,841,714 | 10/1974 | Schultz | 303/9 X |
| 3,909,069 | 9/1975 | Durling | 303/9 |

*Primary Examiner*—Duane A. Reger
*Attorney, Agent, or Firm*—Woodrow W. Portz

[57] ABSTRACT

A tractor-trailer air-pressure brake system which includes a tractor protection control valve, a parking valve, and a trailer fill valve of special design provided for the purpose of achieving a desired non-confusing pattern of control positions whereby safety and convenience of brake operation is enhanced.

9 Claims, 13 Drawing Figures

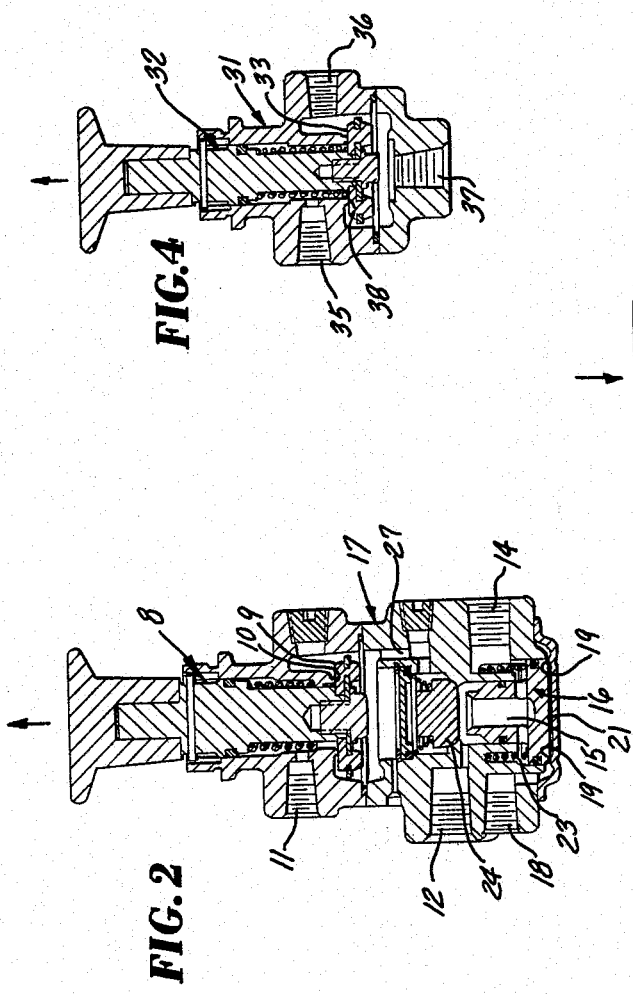
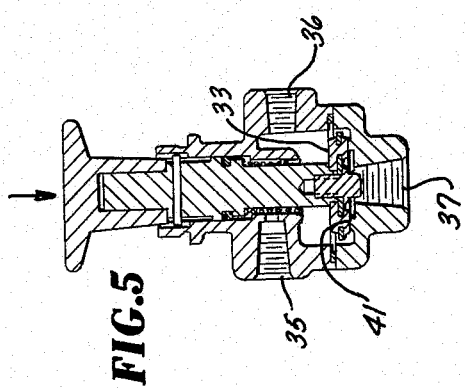
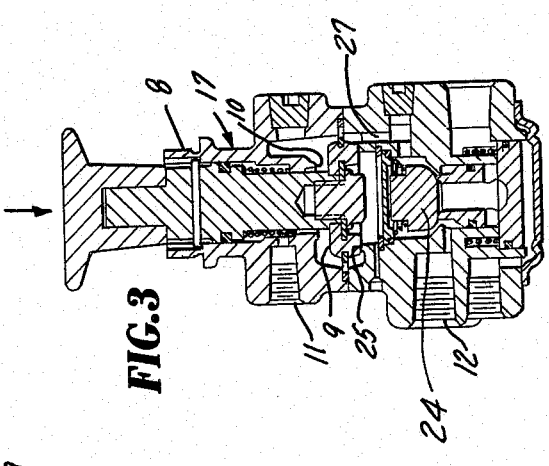
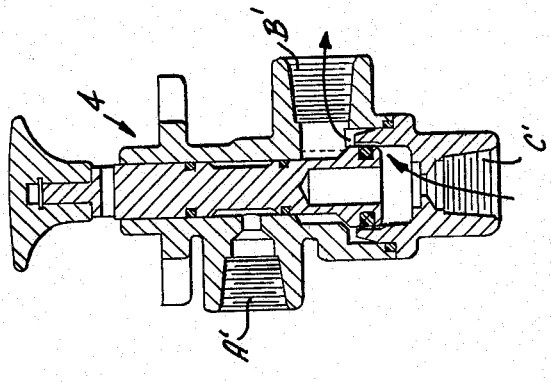

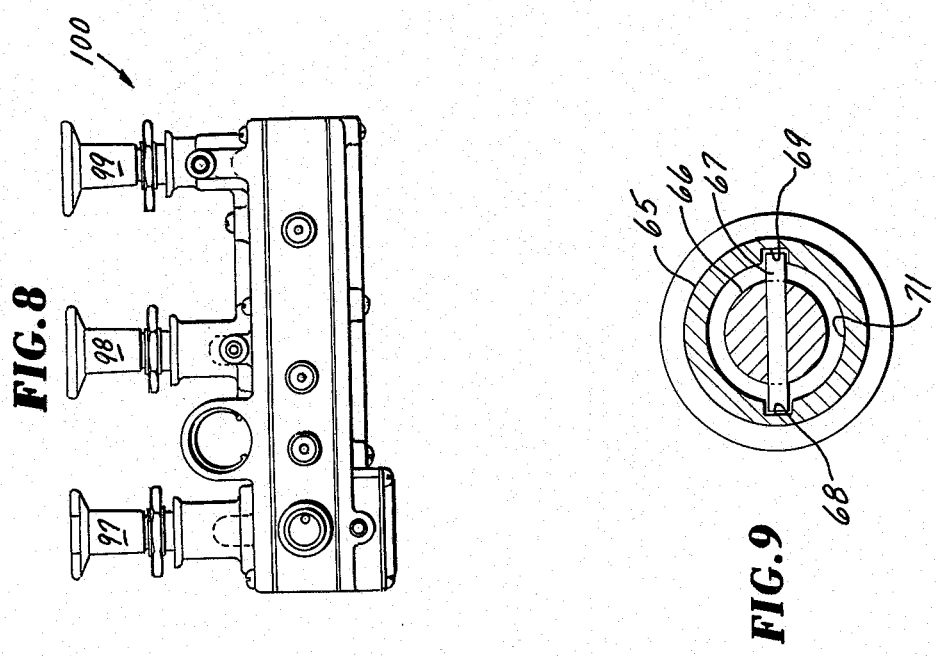
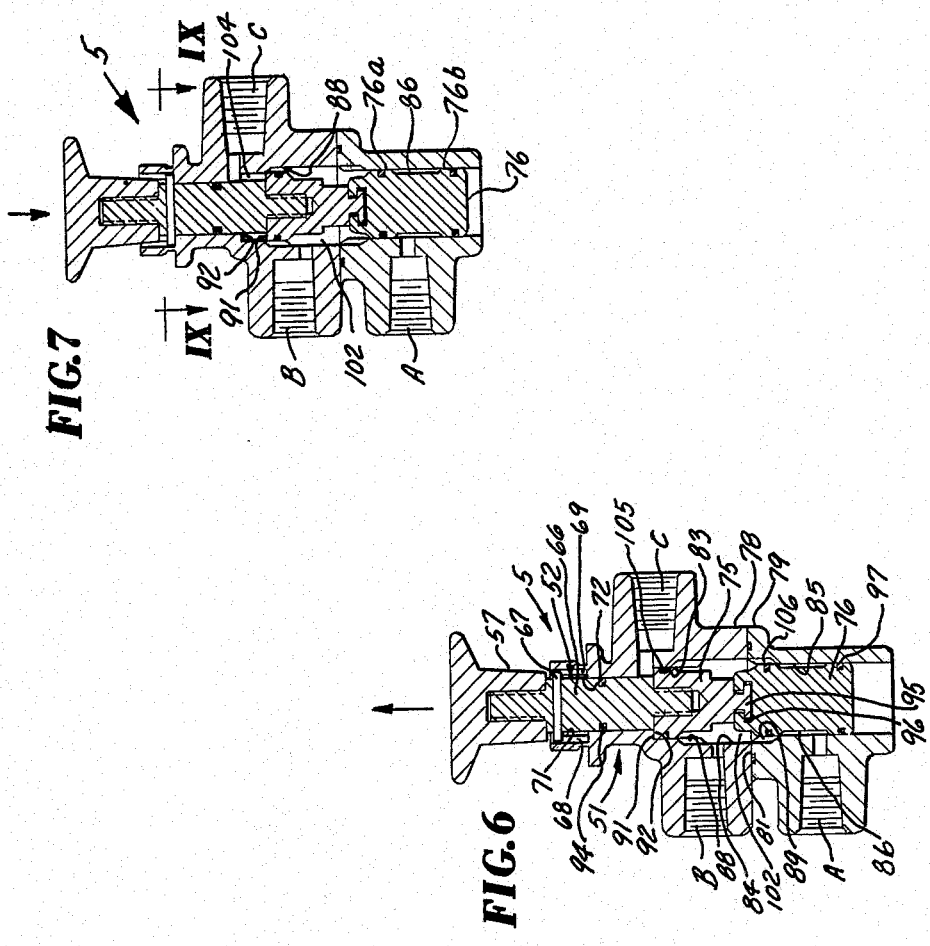

U.S.Patent  May 9, 1978  Sheet 3 of 4  4,088,374

Road operation - all brakes released

Rig parked - tractor rear brake set & trailer brake released

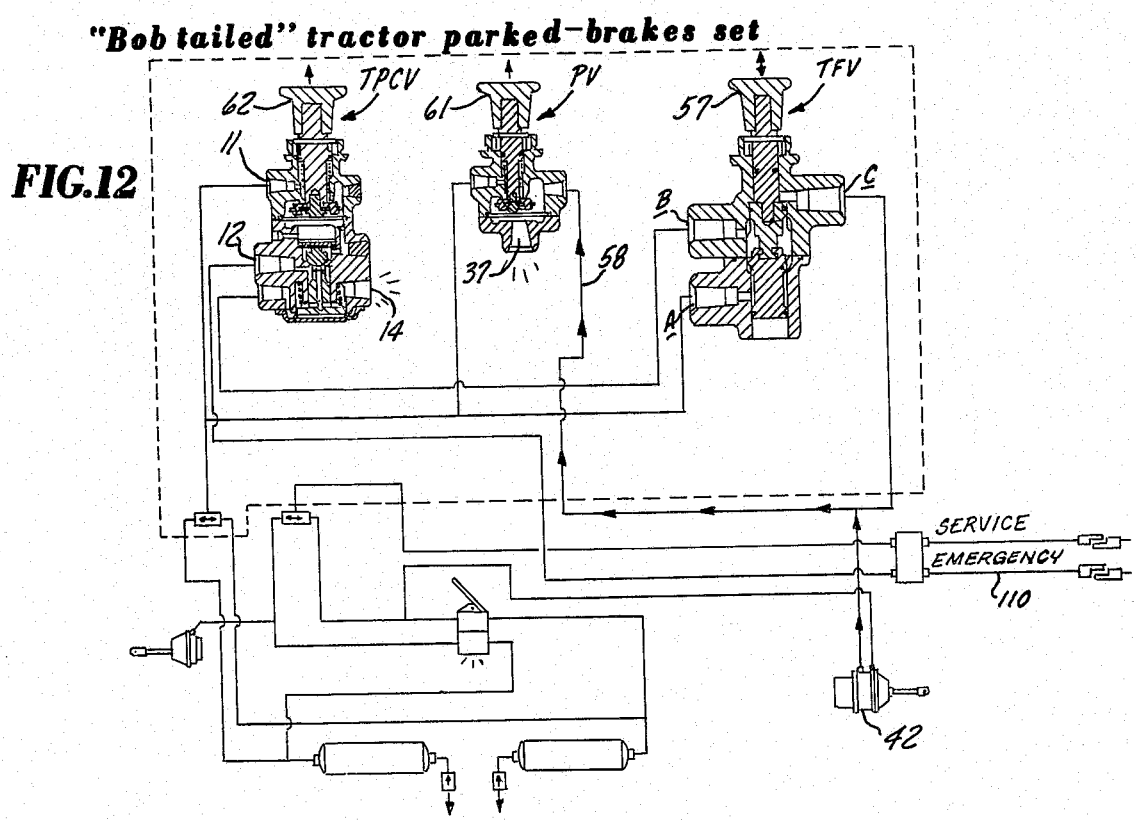
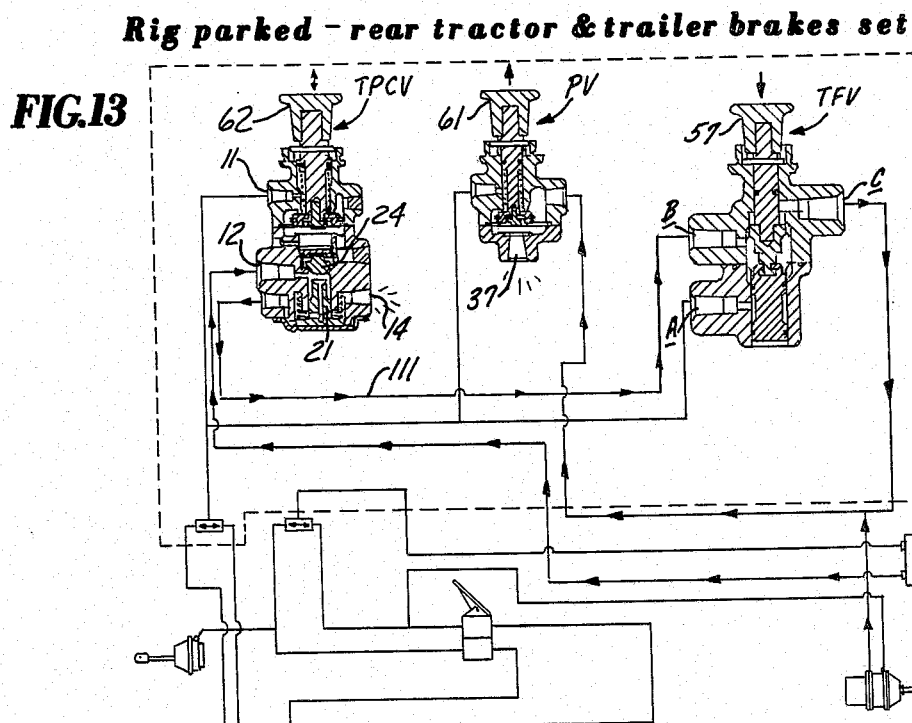

AIR PRESSURE BRAKE ARRANGEMENT FOR TRACTOR AND SEMI-TRAILER COMBINATIONS

BACKGROUND OF THE INVENTION

Modern highway tractor-trailer rigs are now equipped with air-activated brake systems which incorporate certain structural features required by the government and the trade. One important requirement imposed by regulation FMVSS-121 is that the parking brakes have to be set on the tractor and the trailer by a single control, i.e., a parking valve (hereinafter known as "PV") when parking the rig. Another important requirement is a control, now embodied in the commonly used tractor protection control valve (hereinafter known as "TPCV") which plugs the tractor system from leakage through the trailer connections during "bob-tail" tractor operation, or when rupture of a tractor-to-trailer air line occurs. In order to maintain operator use of brake controls as simple and foolproof as possible, it is desirable, if not essential, that a PV (parking valve) set the brakes of a "bob-tailed" tractor as well as the full rig in spite of some circuitry complications arising out of the inclusion of a tractor protection control valve in the system.

During the years 1975 and 1976, it was recognized that air brake systems conforming to regulation FMVSS-121 having only a TPCV and a PV, permitted a rig to roll freely if parked on an incline if an attempt was made to pressurize the trailer system. It was found during pressuring up that all brakes of the rig were released at an intermediate pressure and, unless the operator was in the seat ready to use pedal control, the rig was free to roll. At this stage of development, a trailer fill valve (hereinafter known as "TFV") was designed and incorporated into a system already containing the TPCV and the PV so that the trailer air system could be filled while the tractor brakes were securely set during the pressuring up operation. The TFV (trailer fill valve) currently used takes the prior art form shown in FIG. 1. Hence, a truck operator now has mounted within easy reach, three valves consisting of a TPCV, a PV, and a TFV. The valves present to the operator three push/pull handles. When the system comprises a TPCV as shown in FIGS. 2 and 3, a PV as shown in FIGS. 4 and 5, and a prior art TFV a shown in FIG. 1, road operation requires that the handle of the TPCV and the PV be pushed down while the TFV handle be pulled out.

With a view to making the brake system as foolproof as possible, it is an essential object of the invention to provide an air brake system for tractor-trailer rigs which includes the three above indicated valves mounted in juxtaposition, such as in a module, on which the handles of all valves may be in similar positions during normal operation of the rig. For example, valves with push/pull control motion with fully pushed-in positions for road operation are preferred.

SUMMARY OF THE INVENTION

In brief, the invention resides in a three-valve control assembly for a tractor-trailer air brake system comprising a TPCV (tractor protection control valve), a PV (parking valve), and a TFV (trailer fill valve) in which all valves have push/pull manual controls and such controls are pushed inward of the respective valve bodies to "bottom" positions during normal operation of the tractor-trailer rig. While the TPCV and the PV of this assembly are conventional, the TFV is constructed to a design heretofore unknown which enables its control element to be pushed of its body for operation in which a trailer brake release line and/or trailer air reservoir are constantly connected with another air pressure source on the tractor. This condition is necessarily maintained in the normal operation of the rig. Within the brake system, the TFV has one outlet port connected with the TPCV as the sole source of signal pressure for the relay section of the TPCV. The TFV has two inlet ports for alternatively furnishing pressure to the TFV outlet port depending on the position of the push/pull assembly thereof. One inlet port is connected with the PV and the other inlet port is connected with the tractor air pressure source. The push/pull assembly of the TFV is constructed so that pressure from the PV entering the respective connected inlet port of the TFV will automatically force the push/pull assembly inward because of a difference in piston cross sections, to a pushed-in position wherein the interior of the TFV is arranged to pass air from the main tractor pressure source by way of the PV to the relay section of the TPCV which then releases air to the trailer reservoir section providing the push/pull assembly of the TPCV is in its pushed-in position.

As departures from past TFV construction, the TFV of the invention is constructed solely with laterally oriented ports, an articulated push/pull assembly, a plural-piece body to reduce manufacturing costs through the elimination of close tolerances of coaxial alignment of various parts of the TFV, an automatic pull-in feature and a non-rotating handle.

BRIEF DESCRIPTION OF THE DRAWING

FIG. 1 is a view in cross section taken along the longitudinal axis of a prior art trailer fill valve;

FIGS. 2 and 3 are plunger-retracted and plunger-depressed views in cross section of a tractor-protection control valve taken along its longitudinal axis.

FIGS. 4 and 5 are plunger-retracted and plunger-depressed views in cross section of a parking valve used in conjunction with the valve of FIGS. 2 and 3 taken along its longitudinal axis.

FIGS. 6 and 7 are plunger-retracted and plunger-depressed views in cross section of a trailer fill valve used in conjunction with the two valves of FIGS. 2 to 5 taken along a longitudinal axis.

FIG. 8 is an elevation view illustrating a control module which incorporates three valves substantially similar in construction to the valves of FIGS. 2 to 7.

FIG. 9 is a view in cross section taken along line IX—IX of FIG. 7.

FIGS. 10 to 13 are diagrammatic views of a tractor-trailer brake system incorporating the valves of FIGS. 2 to 7 showing various conditions of the system, particularly the settings of the valves, under various conditions.

DESCRIPTION OF THE PREFERRED EMBODIMENT

Figure 10:
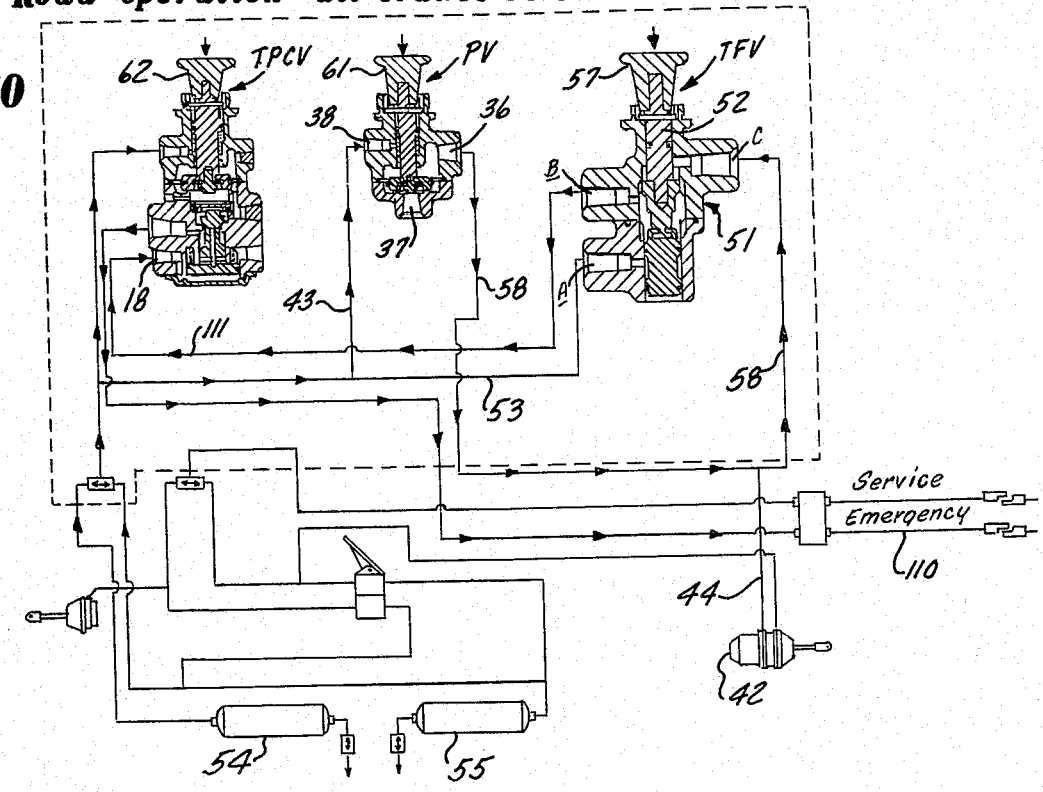

FIG. 1 illustrates a prior art valve exemplary of trailer fill valves now in use in trailer brake systems which include a tractor protection control valve, a parking valve and trailer fill valve arranged to function somewhat as shown by the arrangement illustrated in FIGS. 10 to 13. In present systems, such valves are typically of manual push/pull type with the operating knobs projecting laterally or upwardly along parallel push/pull axes with the valves in close proximity. A source of confusion according to present designs, is that the knob of the trailer fill valve exemplified by FIG. 1 must be in a pulled-out position while the knobs of the other two valves are in a pushed-in position for highway operation. This is even more confusing at nighttime. Ports A', B' and C' correspond in function to ports A, B and C, respectively, of the improved trailer fill valve 5 of FIGS. 6 and 7. The valve of FIG. 1 is shown in the pulled-out position wherein ports C' and B' are connected to deliver fluid in the same manner as is accomplished by the TFV of FIG. 7 in its plunger-depressed condition preparing the system for road operation of the rig as illustrated in FIG. 10.

The TPCV and PV of FIGS. 2 to 5 are of known design but are illustrated and described herein for an understanding of the air brake system illustrated in FIGS. 10 to 13. FIGS. 2 and 3 illustrate the TFCV as having manual plunger valve means, such as the plunger 8. In FIG. 2 the plunger is in retracted position wherein a resilient poppet 9 of the plunger engages a seat 10 to stop flow through the valve from an inlet port 11. In plunger-retracted condition, any pressure in a line connected with the outlet port 12 will have escaped through an exhaust port 14 by way of passageway 15 extending longitudinally and then laterally through the piston 16. Piston 16 is an element of the TFCV and is forced inwardly of the valve housing by fluid under pressure entering the housing 17 through a relay port 18 to flow past bosses 19 to apply pressure to surface 21 of the piston 16. When relay signal pressure is applied to piston 16, the piston moves against a return spring 23 to engage and unseat relay valve element 24 as shown in FIG. 3. If the plunger is positioned inwardly of the housing 17 as shown in FIG. 3 to cause poppet 9 to engage seat 25, fluid then flows from supply port 11 through the valve housing by way of passageway 27 and past the unseated element 24 to the outlet port 12.

The PV (parking valve) of FIGS. 4 and 5 has a housing 31 and plunger 32 terminating inwardly of the housing in a resilient poppet element 33. The PV has a first port 35 normally connected with the main air supply of the system of FIGS. 10 to 13 and a second port 36 connected with the rear axle brakes of the tractor. The other of the three ports of the valve is an exhaust port 37 which is placed in communication with the second port 36 and the rear axle brakes of the tractor when the plunger 32 is in its plunger-retracted condition, as shown in FIG. 4 in which the poppet element 33 engages seat 38 so as to block flow of air from the supply port 35. Ports 36 and 37 are thus connected for exhausting air from the tractor rear brakes to the atmosphere through port 37. When the PV is in the plunger-depressed condition as shown in FIG. 5, poppet element 33 engages seat 41 as shown in FIG. 5, to thereby place port 35 in communication with port 36 whereby air may reach the brake release chambers of brake actuators 42 through line 43, the PV and line 44.

A major feature of the invention is the provision of the TFV (trailer fill valve 5) within the brake system illustrated in FIGS. 10 to 13.

The TFV comprises a housing 51 and a manual plunger 52. The housing has a third port A connected by line 53 and another contiguous line, with air reservoirs 54, 55. PV line 43 also ties into line 53. Port A is furthest of the three TFV ports from the handle 57 of the plunger. Of the two other ports of the TFV housing, port C is nearer to the handle end of the plunger. Port C is connected by line 58 to port 36 of the PV and the brake release chambers of rear tractor axle brake actuators 42. TFV port B is connected solely to TPCV relay air port 18 and is the sole source of pressure therefor.

Features of the TFV are (1) handle-depressed position of the plunger relative to the housing 51 at fully released condition of the air brakes of the entire rig; (2) non-rotatability of the plunger relative to the housing 51; (3) two-part construction of the housing and articulated construction of the plunger enabling low cost manufacturing of the TFV; (4) solely lateral porting of the TFV housing to conform with solely lateral porting of the TPCV and PV as a space saving feature; (5) simplified bore arrangement of two-piece valve housing; and (6) automatic depression of the TFV plunger when the TPCV plunger and the PV plunger are in depressed positions.

It is highly desirable to utilize the top surfaces of the knobs 57, 61, and 62 as surfaces on which to imprint operating constructions for the TFV, PV and TPCV, respectively. For this reason, these knobs are made non-rotatable by the structure common to each valve but now described specifically with respect to the TFV. For non-rotatability of the plunger 52, the housing 51 is constructed with a generally cylindrical extension 65 surrounding a handle-receiving portion, i.e., shaft 66 of the plunger 52. A pin 67 extends transaxially through the shaft 66 and is of sufficient length to project radially beyond the outer surface of shaft 66 into grooves 68, 69 extending longitudinally along the inner cylindrical surface 71 of the extension 65. The pin 67 has a further function in cooperation with an inner shoulder surface 72 of the housing 51 whereby the pin and the shoulder surface form a stop for the plunger defining its depressed or inner position relative to the housing.

In addition to the handle 57, the plunger 52 is constructed in three parts comprising in an order preceding away from the handle 57, shaft 66, an intermediate portion or bell 75, and a spool 76.

The housing 51 is constructed in a two-port portion 78 and a one-port portion 79 joined by a fastener means, such as cap screws, not shown, along a plane of separation at 81. The housing 51, in accommodating the plunger 52, has a central rectilinear passageway comprising in the order named, a first passageway portion adjacent the handle end of the plunger of smallest diameter complementary to the exterior surface of a first plunger portion, i.e., shaft 66, a second passageway portion of intermediate diameter at 83 conforming to the plunger's largest outer diameter, i.e., that of the second plunger portion or bell 75; a third passageway portion 84 of largest diameter of which its length overlaps portions of the lengths of the bell 75 and a spool 76 of the plunger, and a fourth passageway portion 85 furthest from the plunger handle having the same (intermediate) diameter as that of passageway portion 83 within which plunger spool 76 may reciprocate. The spool comprises the third and fourth portions 76a, 76b of the plunger separated by a neck 86. The largest diameter portion 84 of the passageway has flutes 88 and 89 at opposite ends having radially inner surfaces which lie along a surface of revolution of passageway portions 83 and 85.

The shaft 66 and the bell 75 of the plunger are joined by means, such as the male and female sections thereof in threaded relationship as shown in FIGS. 6 and 7. Since the shaft and the bell are of different diameters, a radially extending shoulder 91 is formed on bell 75 which engages housing shoulder 92 as stop means for the plunger at its retracted position.

The TFV plunger is specially constructed with lost motion means to allow for such imperfections in manufacturing as would cause slight eccentricity in portions of the housing passageway. Accordingly, the bell 75 is provided with a T-shaped tongue 95 which fits into a T-shaped recess or groove 96 of the spool 76. The recess is constructed to fit the tongue portion closely in an axial direction but loosely in all transaxial directions in order to allow spool 76 to adjust laterally with respect to the bell 75 in accommodating any eccentricity in the construction of the housing passageway. The plunger 52 is suitably grooved for receiving resilient O-rings 94, 105, 106 and 97 to seal adjacent regions of the valves from each other when subjected to different pressures.

Figure 11:
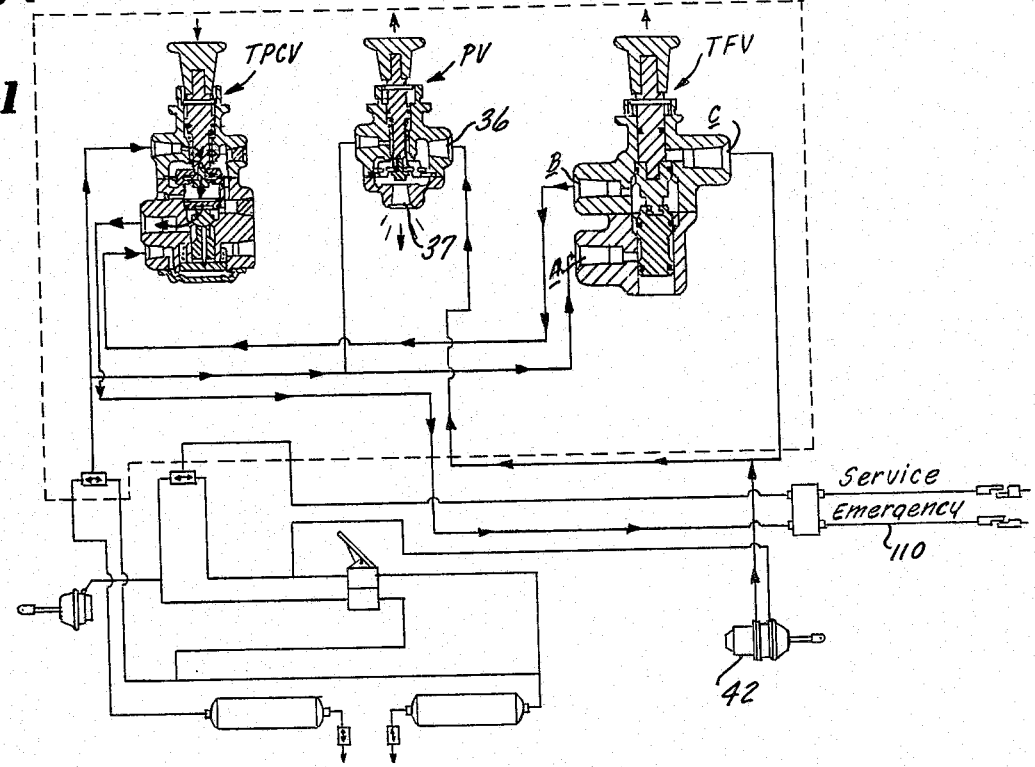

The TFV is in its plunger-retracted condition as shown in FIG. 6. This is the condition of the TFV utilized in the brake system as illustrated in FIG. 11 when the rig is parked with the tractor rear-axle brakes set and the trailer brakes released. This condition of the TFV may be optionally assumed when the plungers of the TPCV and PV are retracted as shown in FIG. 12 to attain setting of the rear axle spring brakes of the tractor when the tractor is "bob-tailed", i.e., separated from a trailer. In the various figures illustrating any one of the valves, TPCV, PV, or TFV, the positions of the plungers are indicated by arrows drawn above handles 62, 61, and 57. At plunger-retracted condition port A of the TFV communicates with port B through the undercut region 101 of the spool 76, the flutes 89, and the region surrounded by passageway surface 84.

At TFV plunger-depressed condition, as typified in FIG. 7, port C is placed in communication with port B through a region 104 opened up by separation of the plunger surface 91 and the housing surface 92, through the flutes 88, and region 102 of the passageway. Plunger-depressed condition of the TFV is utilized by the brake control system in road operation as illustrated in FIG. 10, or the parking situation as illustrated in FIG. 13, and optionally in FIG. 12.

FIG. 8 illustrative of a three-knob control module 100 comprising a tractor protection control valve 97, a parking valve 98, and trailer fill valve 99 of similar construction and operation to the TPCV, PV, and TFV of FIGS. 2 to 7, and adapted to substitute therefor in the system of FIGS. 10 to 13.

In attempting to understand the control system as depicted by FIGS. 10 to 13, it should be noted that the main function of the tractor protection control valve (TPCV) is to connect the main reservoir supply in the trailer with the tractor air supply in tanks 54, 55 providing the TPCV has a signal pressure to its relay section from the trailer fill valve (TFV). The essential function of the parking valve (PV) is to unload the pressured brake-release chambers of the rear axle tractor brake actuators 42. During road operation of the rig, the PV assists the TFV in providing signal pressure to the TPCV relay section. The essential function of the trailer fill valve (TFV) is safety, i.e., the trailer reservoir system may be filled (which of necessity releases the trailer brakes) without releasing the towing vehicle park brake and thereby allowing an inadvertent roll away.

Observing now FIG. 10, when the rig is ready for road operation, all three handles are in the plunger-depressed (inward) position thereby enabling the TFV to transmit a signal pressure through line 111 to the TPCV which, with handle down, allows air to flow from its inlet port 11 to its outlet port 12 and then through line 110. The depressed handle of the PV enables pressure to be transmitted from the main tractor reservoirs through line 43, PV ports 38 and 36 and thence by line 58 to the brake-release chambers of actuators 42. Since line 58 also pressures TFV port C, pushing the PV handle inward will cause the TFV plunger 52, if outward, to automatically snap to its inward position as pressure acts on bell surface 91. When the plunger 52 is outward, ports A and B are connected and the plunger is otherwise under balanced pressure.

Referring now to FIG. 11, if it is desired to park the rig with only the rear tractor brakes set but the trailer brakes released, the valve handles are adjusted according to FIG. 11 wherein the PV handle is shown outward thereby allowing air to escape from the brake releasing chambers of actuators 42. Since the plunger-retracted PV is discharging to the atmosphere through PV port 37 with consequent zero pressure on port C of the TFV, the TFV handle 57 can be retracted to allow communication through ports A and B of the source pressure from tanks 54, 55 with the relay section of the TPCV so as to maintain the function of the TPCV in supplying air through line 110 to the released brakes of the trailer.

In "bob-tailed" tractor operation (FIG. 12), i.e., without a trailer attached, the important condition of this system is that the TPCV handle be pulled outwardly (retracted) to assure that air from the tractor reservoirs will get no further than TPCV port 11 instead of its normal channel through outlet port 12 and line 110 to the trailer. At this setting of the TPCV, it is optional to have the plunger of the TFV either retracted or depressed. The retracted TFV handle places port A in connection with port B and pressure supply line 53 to "dead end" through line 111 in the signal chamber of the relay section of the TPCV. On the other hand, if the TFV handle 57 is pushed inward, ports B and C are in communication allowing the relay signal chamber to reach zero pressure and seating of the relay valve element 24 providing the PV plunger handle 61 is retracted to allow air to exhaust from actuators 42 through line 58 through PV port 37.

FIG. 13 illustrates the brake control system with handles 62, 61 and 57 adjusted for parking of the rig with the rear tractor axle brakes and the trailer brakes operative or set. The essential adjustment of the valve is that the PV handle be in its outward or retracted position and that the TFV handle be in its depressed or inward position. The TPCV handle may be in either position since in either case only the relay section of the TPCV is operative with element 24 seated to restrict any passage of air from supply port 11 to outlet port 12. The plunger depressed condition of the TFV places TFV ports B and C in communication to assure that air will drain from the relay signal chamber of the TPCV through the TFV and through the PV to exhaust through port 37. This causes retraction of the relay piston 21 which allows air to drain through line 110 from the trailer reservoir system through TPCV port 12 and outward of TPCV port 14. In this manner, valve adjustment according to FIG. 13 sets the brakes of both the tractor and the trailer. An operator may prefer the inward position of TPCV handle 62 in order to apply pressure internally of the valve to the relay element 24 tending to seat it more firmly. This practice is likely preferable from the standpoint that it requires the operator to retract only the PV handle 61 to attain complete park braking of the rig.

What is claimed is:

1. A tractor and trailer air brake system comprising:
   tractor-mounted air-pressure supply means;
   pneumatic brake actuators on the tractor;
   pneumatic brake actuators on the trailer;
   at least one tractor axle having brake release pressure chambers and all actuators having brake actuating pressure chambers;
   a tractor-to-trailer supply line connected with said brake release chambers of the trailer actuators;
   a tractor-to-trailer service line placing said supply means in communication with said brake actuating pressure chambers of the trailer actuators;
   a four-port tractor protection control valve (TPCV) comprising a housing having an air-receiving inlet port, an outlet port connected with said trailer supply line, a relay air port and an air exhaust port; said TPCV comprising manual plunger valve means and relay valve means in tandem between said inlet and outlet ports, said plunger valve means being movable between an outward position against a seat closing off said supply port and an inward position against a second seat providing air passage to said relay valve means, a relay piston comprising an exhaust valve means communicating said outlet port with said exhaust port, said piston being engageable with said relay valve means to open it and close said exhaust valve means, and a relay air port and chamber for receiving and applying air pressure to said piston;
   a three-port parking valve (PV) having a housing providing a first port, a second port, an exhaust port, said PV comprising manual plunger means movable between an outward position closing said first port and placing said second port in communication with said exhaust port, and an inward position placing said first and second ports in communication while closing said exhaust port;
   a three-port trailer fill valve (TFV) having a housing providing a third port connected with said pressure supply means and said first port of the PV and said inlet port of the TPCV, a fourth port connected with said TPCV relay air port, and a fifth port connected with the PV second port and said brake release chambers of the tractor; said TFV comprising a manual plunger movable between an outward position in which the third port communicates with the fourth port and an inward position in which said fourth port communicates with said fifth port.

2. The tractor and trailer air brake system of claim 1 wherein:
   said TPCV, PV, and TFV are valves grouped into an assembly of adjacent valves to align said TPCV plunger valve means, said PV plunger means, and said TFV plunger along substantially parallel axes of longitudinal movement with a push/pull handle for each located in adjacent relation with the other of said handles at the same side of said assembly whereby the three handles are positionable at respective inward positions which correspond to released condition of all brakes controlled thereby.

3. The tractor and trailer air brake system of claim 2 wherein:
   the TPCV, PV and TFV comprise guide means partly mounted on plunger valve means, plunger means, and plunger to interact with portions of the guide means mounted on each of said housings and prevent rotation of said plunger valve means, said plunger means, and said plunger relative to respective housings.

4. The tractor and trailer air brake system of claim 1 wherein:
   said TFV housing has a rectilinear passageway extending therethrough for receiving said plunger and comprising, in the order named, a first portion nearest the handle of said plunger of smallest diameter, a second portion of intermediate diameter, a third portion of largest diameter, and a fourth portion furthest from the plunger handle of approximately said intermediate diameter, said third portion having radial and longitudinally extending flutes at opposite ends thereof which do not extend radially inwardly beyond cylindrical projections of the second and fourth portions;
   said third, fourth, and fifth ports being separately contiguous with said fourth, third, and second passageway portions, respectively;
   said plunger having a first portion complementary in diameter to said first passageway portion, a second portion having a diameter approximately that of said intermediate passageway diameter defining an end surface adapted to seat against a shoulder defined by the junction of said first and second passageway portions and adapted by the length of the first plunger portion to reciprocate into the third passageway portion beyond the second passageway portion, a third plunger portion spaced from the second plunger portion to reciprocate from a position wholly within said third passageway portion to a position with said fourth passageway portion, said fourth plunger portion being separated from said third plunger portion by a neck and spaced from the third plunger portion to reciprocate within a section of the fourth passageway portion beyond said third port.

5. The tractor and trailer air brake system of claim 4 wherein:
   said plunger is articulated in a section thereof connecting the second and third plunger portions and comprises lost motion connecting means enabling lateral adjustment of the first and second plunger portions relative to the third and fourth plunger portions.

6. The tractor and trailer air brake system of claim 5 wherein:
   said TFV housing comprises two parts joining substantially along a plane of separation extending through said third passageway portion.

7. The tractor and trailer air brake system of claim 4 wherein:
   one of the first and second plunger portions has an axially-extending threaded recess and the other portion has an exteriorly threaded boss receivable into said recess for joining said first and second plunger portions.

8. The tractor and trailer air brake system of claim 4 wherein:
   said plunger of the TFV is automatically shifted from outward position to inward position by application of pressure from the PV at plunger-depressed condition through said TFV fifth port to said end surface of the second plunger portion.

9. The tractor and trailer brake system of claim 4 wherein:
   said port of the second passageway portion communicates with said plunger end surface at outward position of the plunger to facilitate automatic movement of the plunger to its inward position in the presence of pressure in said port and the second passageway portion.

* * * * *

UNITED STATES PATENT AND TRADEMARK OFFICE
CERTIFICATE OF CORRECTION

PATENT NO. : 4,088,374
DATED : May 9, 1978
INVENTOR(S) : Robert M. Gute

It is certified that error appears in the above-identified patent and that said Letters Patent are hereby corrected as shown below:

Column 3, lines 18 and 27, change "TFCV" to --TPCV--.

Signed and Sealed this

Sixth Day of March 1979

[SEAL]

Attest:

RUTH C. MASON
Attesting Officer

DONALD W. BANNER
Commissioner of Patents and Trademarks